United States Patent [19]

Wakunami

[11] 4,239,304
[45] Dec. 16, 1980

[54] BEARING SPLIT CAGE

[75] Inventor: Teruaki Wakunami, Sagamihara, Japan

[73] Assignee: The Torrington Company, Torrington, Conn.

[21] Appl. No.: 24,611

[22] Filed: Mar. 28, 1979

[51] Int. Cl.³ .............................................. F16C 33/50
[52] U.S. Cl. .................................................... 308/217
[58] Field of Search .................. 308/201, 202, 207 R, 308/217, 218, 212, 213

[56] References Cited

U.S. PATENT DOCUMENTS

| 1,125,316 | 1/1915 | Heinzelman | 308/218 |
| 1,611,976 | 12/1926 | Williford | 308/217 |
| 2,033,074 | 3/1936 | Herrmann | 308/217 |
| 3,353,881 | 11/1967 | Steinert | 308/217 |
| 3,788,715 | 1/1974 | Alling | 308/217 |

*Primary Examiner*—Frederick R. Schmidt
*Attorney, Agent, or Firm*—Frank S. Troidl

[57] ABSTRACT

A cage for a roller bearing is discontinued at a plurality of locations on the circumference of a circle and has connector means for connecting adjacent cage pieces at opposed boundary surfaces of the discontinuous portions. Each of the adjacent cage pieces has connector means constructed so the adjacent cage pieces cannot be separated in a circumferential direction. Circumferential clearances permit enlargement and reduction of the diameter of the cage. If desired, the connector means may be constructed to also prevent the adjacent cage pieces from separating radially or axially, or both.

4 Claims, 16 Drawing Figures

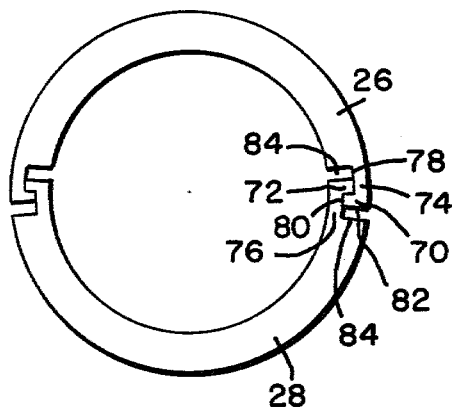
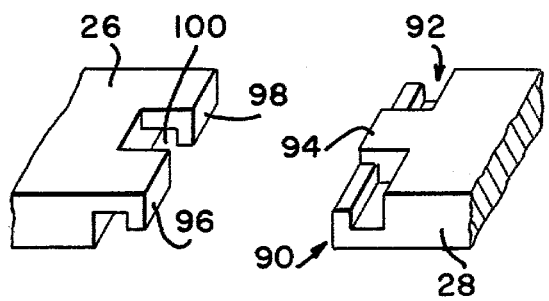
FIG. 7          FIG. 8
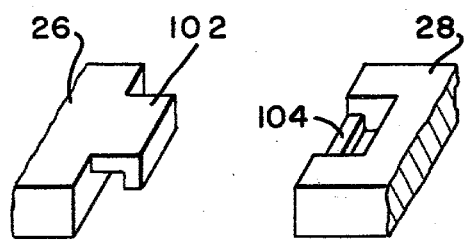
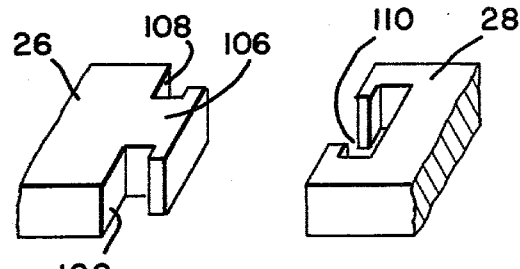
FIG. 9          FIG. 10
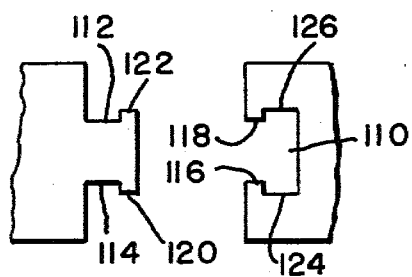
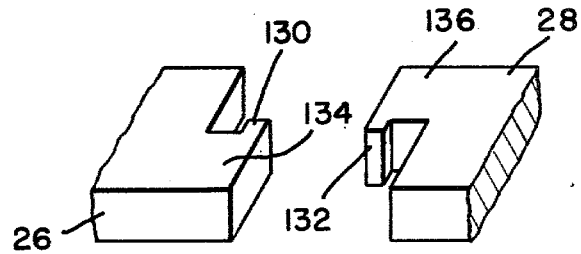
FIG. 11          FIG. 12

BEARING SPLIT CAGE

This invention relates to improvements in a cage for roller bearings which is discontinued at a plurality of locations on the circumference of a circle.

Cages which are discontinued at one or more locations on the circumference of a circle are known.

In known cages which are discontinued at one location, the diameter of the cage cannot be reduced and where the diameter of the cage is to be enlarged, particularly where the bearing is assembled on a shaft, the discontinuous portion is greatly opened so that excessive stresses act on the discontinuous portion and the diametrically symmetrical portions of the cage damage the cage and, therefore, these portions have to be specially configured so as to be readily opened.

In known cages which are discontinuous at a plurality of locations, connector means for connecting adjacent cage pieces are provided on the opposed boundary surfaces of the discontinuous portions but are connected without circumferential clearance so that the diameter of the cage cannot be enlarged or reduced and this leads to the inconvenience that the cage has to be newly designed and manufactured for bearings having different pitch diameters of rollers even if the rollers are equal in diameter and number.

Depending on the condition of use of the bearing and, for example, when inner and outer races or track members corresponding to the inner and outer races are rotated in the same direction at equal speeds, the rollers existing between the inner and outer races stop their rotation and the assembly of the cage and rollers revolves in the same direction and at the same velocity as the inner and outer races. If a load is imparted to the bearing in this state, there is a disadvantage that impressions are created in the track surfaces of the inner and outer races because the rollers are stopped between the inner and outer races.

The present invention eliminates the problems peculiar to the above-described prior art and provides a cage for roller bearing which can be handled integrally as a unit and can be used within a specific range even for bearings having different pitch diameters of rollers and which prevents creation of impressions.

The invention will become more fully apparent from the following detailed description thereof taken in conjunction with the accompanying drawings wherein:

FIG. 7 is a front view of a cage having the connector means of FIG. 6;

FIG. 8 is a perspective view of a third embodiment of connector means;

FIG. 9 is a perspective view of a fourth embodiment of connector means;

FIG. 10 is a perspective view of a fifth embodiment of connector means;

FIG. 11 is a top view of the embodiment of FIG. 10;

FIG. 12 is a perspective view of a sixth embodiment of connector means;

Figure 1:
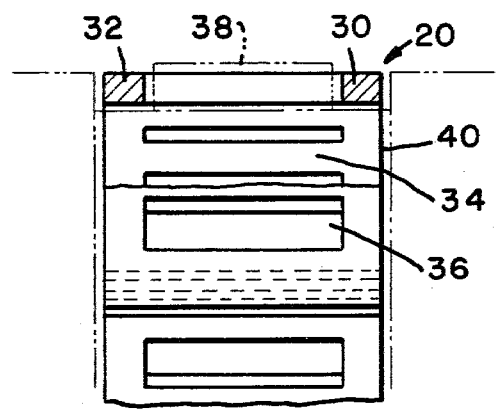
FIG. 1 is a side view, partly in cross section, showing one preferred embodiment of the cage.
Figure 2:
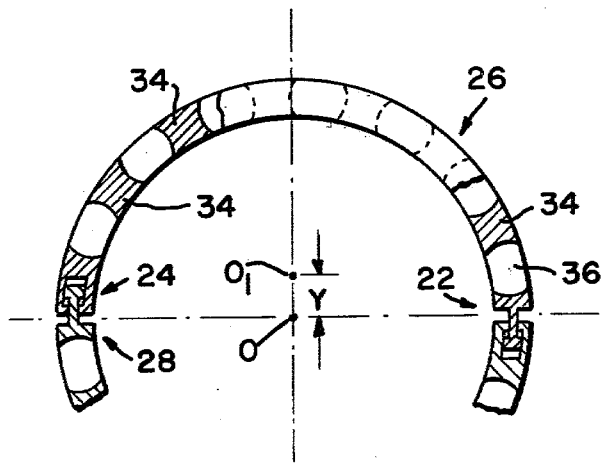
FIG. 2 is a fragmentary front view, on an enlarged scale, partly in cross section, of the cage of FIG. 1.

Referring to the drawings, and more particularly to FIGS. 1 through 5, the cage 20, as shown in FIG. 2, is discontinued at portions 22 and 24, which lie at diametrically symmetrical positions on the circumference of a circle, and comprises cage pieces 26 and 28 connected together. Each of the cage pieces 26 and 28 as shown in FIG. 1, has semicircular rims 30 and 32 interconnected by cage bars 34 forming roller pockets 36. Rollers, such as roller 38 shown in broken lines in FIG. 1 are located in pockets 36. The cage may be mounted on a shaft 40, shown in broken lines, having shoulders, also shown in broken lines, on the opposite sides thereof.

Figure 3:
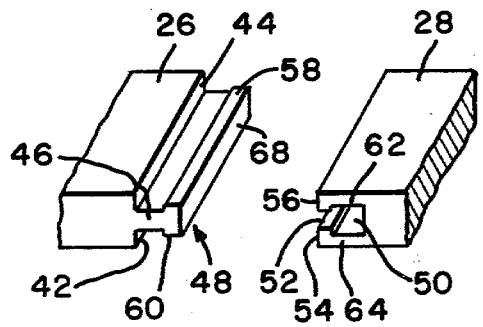
FIG. 3 is a perspective view showing the connector means of the embodiment of FIG. 1 and FIG. 2.
Figure 4:
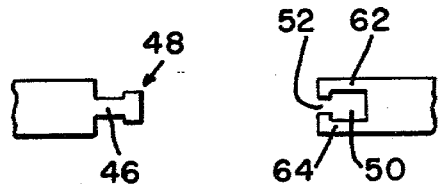
FIG. 4 is a front view of the connector means of FIG. 3 showing the connector means in separated position.
Figure 5:
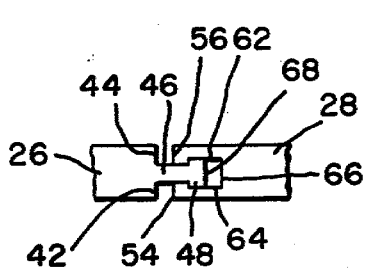
FIG. 5 is a front view showing the connector means of FIG. 4 in connected position.

Referring to FIGS. 3 through 5, cage piece 26 includes equally dimensioned end surfaces 42 and 44 extending along the same radius of the cage. End surfaces 42 and 44 are separated by a portion 46 extending circumferentially from end surfaces 42 and 44. An engaging member 48 is integral with the front end of engagement portion 46 and extends radially outwardly and radially inwardly, as shown in FIG. 3 and FIG. 4.

An axially extending bore 50 is formed in cage piece 28. A radially centrally located slot 52 extends circumferentially from bore 50 to the end surfaces 54 and 56 of cage piece 28. Radial outer surface 58 and radial inner surface 60 on engaging member 48 are engageable with radial outer surface 62 and radial inner surface 64, respectively of bore 50.

The radial dimension of engaging member 48 is greater than the radial dimension of slot 52. The circumferential length of engagement portion 46 is greater than the circumferential length of slot 52. The widths of surfaces 58 and 60 are each less than the widths of surfaces 62 and 64. Therefore, when the cage pieces 26 and 28 are interconnected the surfaces 58 and 60 on engaging member 48 engage surfaces 62 and 64 respectively, of bore 50. As shown in FIG. 5, cage pieces 26 and cage piece 28 may be connected together to thereby prevent circumferential and radial separation therebetween. The clearance between radial walls 42 and 44 and the radially extending end surfaces 54 and 56 of cage piece 28 and the clearance between radial wall 66 of bore 50 and the radially extending end surface 68 of engaging member 48 are necessary for the enlargement and reduction of the diameter of the cage.

The connector means which comprises portion 46 and engaging member 48 on cage piece 26 is generally T-shaped in radial cross-section along planes perpendicular to the axis of the cage. Bore 50 and slot 52 are also generally T-shaped in cross-section along the same planes.

Figure 6:
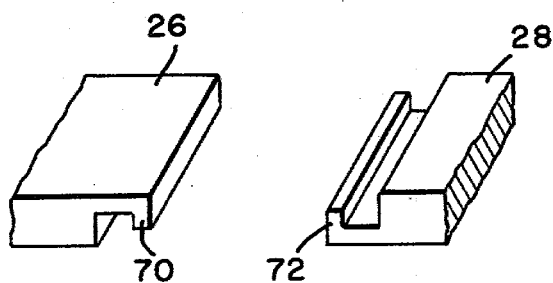
FIG. 6 is a perspective view of a second preferred embodiment of connector means.

FIGS. 6 and 7 show a second embodiment of the connector means possessed by the cage of the present invention, in which the engaging portions are formed into substantially L-shaped members having a leg 70 on cage piece 26 and a leg 72 on cage piece 28. Legs 70 and 72 project in opposite directions to prevent cage pieces 26 and 28 from separating in the circumferential direction. Further, if the discontinuous portions lying at the diametrically symmetrical positions on the circular circumference are made symmetrical in shape as shown in FIG. 7, it will also be possible to prevent the cage pieces 26 and 28 from separating in the radial direction. As shown in FIG. 7, the circumferential length of each of legs 74 and 76 is greater than the circumferential length of each of legs 70 and 72. Thus, when the cage pieces 26 and 28 are interconnected, legs 70 and 72 overlap with the radial outer surface 76 of leg 72 in contact with the radial inner surface 78 of leg 74 and the radial inner surface 80 of leg 70 in contact with the radial outer surface 82 of leg 76 with a circumferential clearance between leg 70 and radial wall 84 on cage piece 28 and a circumferential clearance between leg 72 and radial wall 84 on cage piece 26 for enlarging or reducing the diameter of the cage.

FIG. 8 shows a third embodiment of the cage connector means of the present invention. In this embodiment, L-shaped members 90 and 92 on cage piece 28 are separated by a dovetail 94 and L-shaped members 96 and 98 are separated by the dovetail groove 100 in cage piece 26. When the cage pieces 26 and 28 are connected together, they are prevented from axial separation as well as circumferential separation.

FIG. 9 shows a fourth embodiment of the cage connector means of the present invention. In this embodiment, L-shaped members 102 and 104 are formed only in the central portion of the cage pieces 26 and 28, respectively, and the remainder of the surface is formed as flat surfaces, so that the cage pieces 26 and 28 are prevented from axial separation as well as circumferential separation.

In the third and the fourth embodiment, if the discontinuous portions lying at the diametrically symmetrical positions on the circular circumference are made symmetrical in shape, it will, of course, be possible to prevent the holder pieces 26 and 28 from being separated also in the radial direction.

FIGS. 10 and 11 show a fifth embodiment of the cage connector means of the present invention, in which a T-shaped engaging portion 106 is provided at the axially central portion of the end surface 108 of cage piece 26 and a T-shaped slot engaging portion 110 is formed on the end of cage piece 28 for engagement with the T-shaped engaging portion 106. Surfaces 112 and 114 of the T-shaped engaging portion 106 are circumferentially longer than surfaces 116 and 118 of T-shaped slot 110 and surfaces 120 and 122 on T-shaped engaging portion 106 are circumferentially shorter than surfaces 124 and 126 of T-shaped slot 110 to provide clearances for enlarging or reducing the diameter of the cage. In this embodiment, the cage pieces may be prevented from being separated both in the circumferential direction and in the axial direction.

Figure 13:
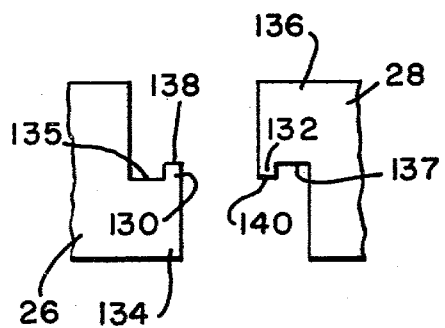
FIG. 13 is a top view of the embodiment of FIG. 12.
Figure 14:
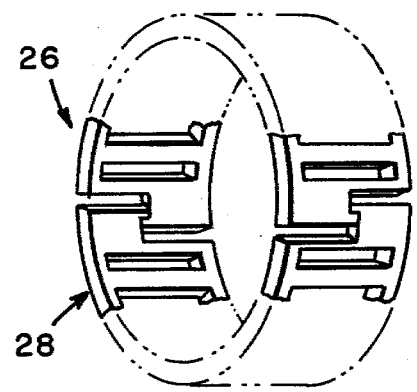
FIG. 14 is a fragmentary perspective view of a cage having the connector means of FIG. 13.

FIGS. 12 through 14 show a sixth embodiment of the cage connector means of the present invention. End fingers 130 and 132 on cage pieces 26 and 28, respectively, extend in opposite axial directions from arms 134 and 136 of cage pieces 26 and 28, respectively. The circumferential length of each of radial surfaces 138 and 140 on fingers 130 and 132, respectively, is shorter than the circumferential length of each of radial surfaces 135 and 137 on cage pieces 26 and 28, respectively, to provide clearances for enlarging or reducing the diameter of the cage.

If the discontinuous portions lying at the diametrically symmetrical positions on the circular circumference are interconnected as shown in FIG. 14, then it will be possible to prevent the cage pieces 26 and 28 from being separated in the axial direction.

Figure 15:
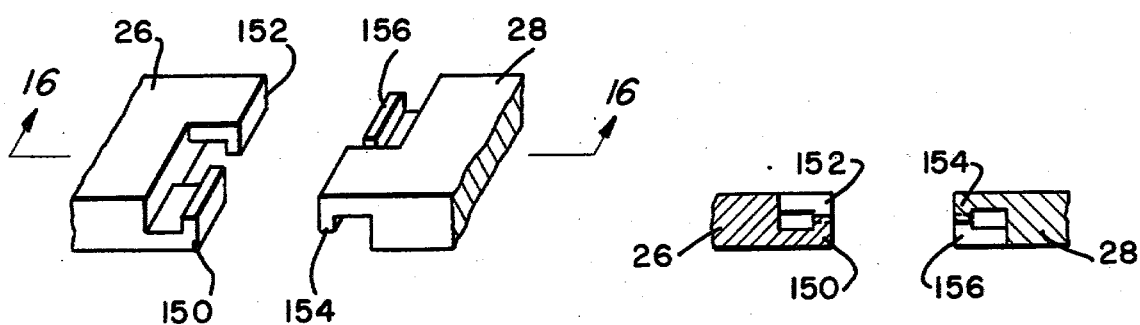
FIG. 15 is a perspective view of a seventh embodiment of connector means.
Figure 16:
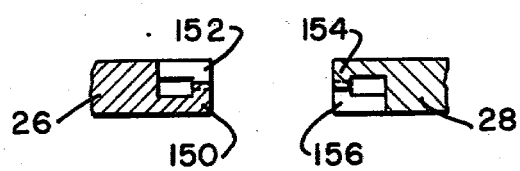
FIG. 16 is a cross-sectional view taken along lines 16—16 of FIG. 15 and in the direction of the arrows.

FIGS. 15 and 16 show a seventh embodiment of the cage connector means of the present invention, in which the circumferential end of cage piece 26 has axially separated, radially oppositely facing L-shaped engaging members 150 and 152 and the circumferential end of cage piece 28 has axially separated radially oppositely facing L-shaped engaging members 154 and 156. L-shaped engaging member 150 faces L-shaped engaging member 154 and L-shaped engaging member 152 faces L-shaped engaging member 156 when cage pieces 26 and 28 are connected.

When cage pieces 26 and 28 are connected, the axially inner radial walls of L-shaped members 150 and 152 engage the axially inner radial walls of L-shaped members 156 and 154, respectively, to prevent axial separation. L-shaped engaging members 150 and 154 overlap and L-shaped engaging members 152 and 156 overlap to prevent radial separation. As with the other embodiments the L-shaped engaging members are constructed to provide radial clearances to permit the reduction or enlargement of the diameter of the cage.

In a cage for a roller bearing according to the present invention, as described above, adjacent cage pieces are formed with connector means which are not separable in at least the circumferential direction, so that the cage pieces corresponding to one cage may be handled integrally to facilitate the handling of the cage, the handling of the cage with rollers held therein and the assembly of the cage to an apparatus and particularly, the diameter of the cage which can be enlarged or reduced leads to common usability of the cage within a specific range for bearings differing in pitch diameter and to an extended life of the cage.

The assembly of the above-described cage and rollers is such that the center of gravity $O_1$ of the assembly is eccentric by Y in the radial direction with respect to the center O of the bearing, as shown in FIG. 2. Thus, the center of gravity $O_1$ revolves around the center O of the bearing, so that rotational torque due to gravity acts on the assembly at the center of gravity thereof. In this case, the connecting portion of the cage of the assembly has connector means having clearances movable in the circumferential direction and, therefore, when at least one of the assembly is in non-loaded condition, the position of the assembly is movable relative to the inner and outer races because of the rotational torque resulting from the gravity. Therefore, even under such a condition of use wherein the inner and outer races are rotating at equal velocities, the assembly is constantly repetitively moved relative to the inner and outer races, thus preventing impressions from being formed on the surfaces of the races due to the load of the bearing and preventing such impressions from being enlarged.

Further, when the inner and outer races are integrally rotated in the same direction with a variation induced in the velocity thereof, the assembly repeats its accelerated movement with a result that inertia force in the circumferential direction of the assembly is created at the aforementioned center of gravity $O_1$ which is eccentric by Y with respect to the center O of the bearing and, thus, the assembly can repeat movement relative to the inner and outer races. This results in the effect of preventing impressions from being formed on the surfaces of the races due to the load of the bearing or preventing such impressions from being enlarged.

As the circumferential clearances in the present invention become larger, the range of common use is widened, but it is desirable to select the dimension of such clearances to three times the diameter of the rollers used or less because of the relation thereof with the load capacity. Also, if the cage is formed of plastics, it will particularly facilitate the shaping of the connecting portions.

I claim:

1. A roller bearing cage comprising: a pair of cage pieces, said cage pieces having interconnected connector means, each connector means being constructed to prevent the separation of the cage pieces and having at least one circumferential surface in slidable contact with at least one circumferential surface of the other connector means, said connector means also being constructed to permit limited relative circumferential movement of the cage pieces to permit the enlargement and reduction of the diameter of the cage.

2. A cage in accordance with claim 1 wherein: one connector means comprises a T-shaped member on one cage piece with the other cage piece having a T-shaped opening for receiving the T-shaped member; the dimensions of the T-shaped member and the dimensions of the T-shaped opening being such that limited relative circumferential movement of the cage pieces is permitted for enlargement and reduction of the diameter of the cage.

3. A cage in accordance with claim 1 wherein: each connector means comprises at least one L-shaped member, with the L-shaped member of one connector means being radially opposite to the L-shaped member of the other connector means, the dimensions of the L-shaped members being such that limited relative circumferential movement of the cage pieces is permitted for enlargement and reduction of the diameter of the cage.

4. A cage in accordance with claim 1 wherein: each connector means comprises an arm and a finger, said fingers extending in opposite axial directions and adapted to engage one another, the dimensions of the arms and the fingers being such that limited relative circumferential movement of the cage pieces is permitted for enlargement and reduction of the diameter of the cage.

* * * * *